March 1, 1927. 1,619,748
C. J. MUEND
VALVE CONSTRUCTION
Filed Feb. 12 1926
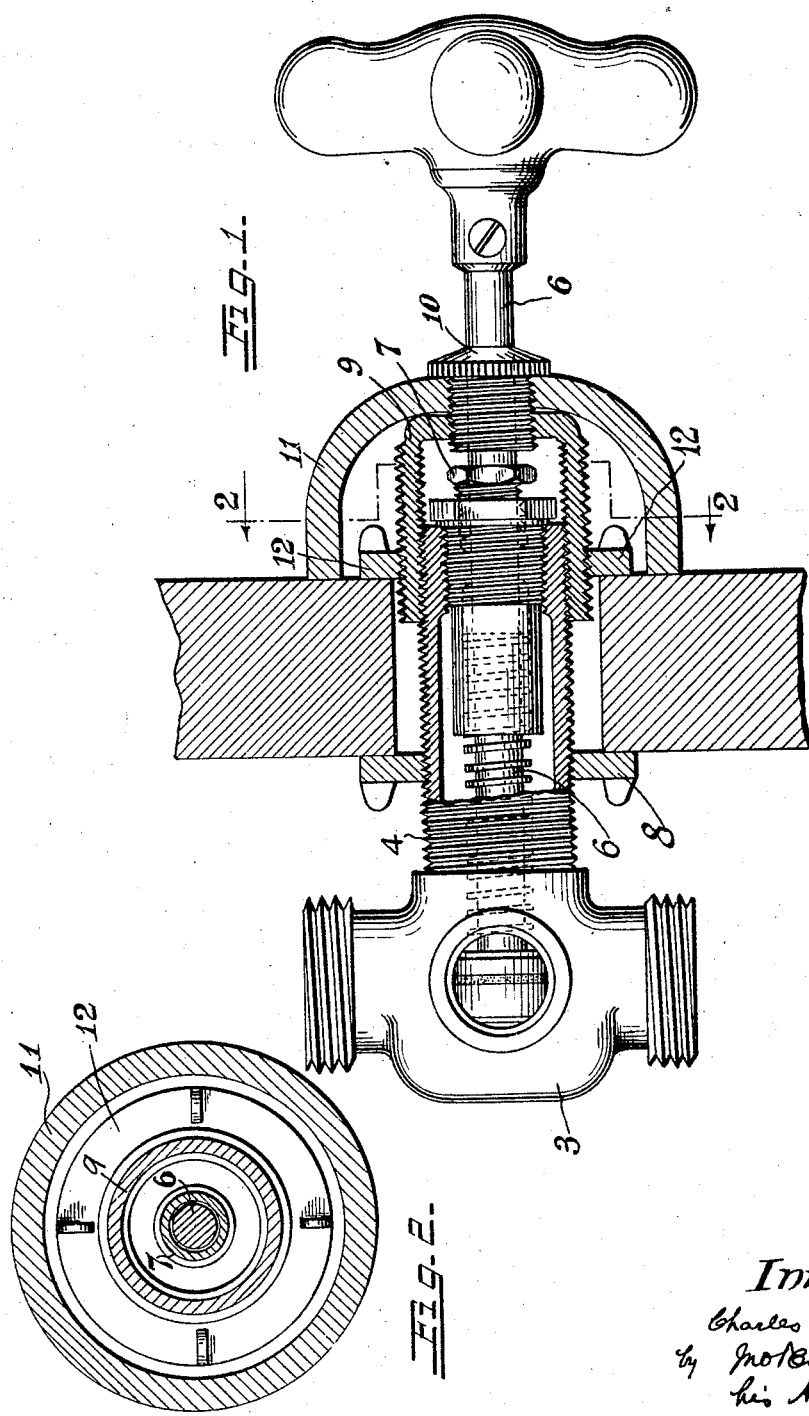
Inventor.
Charles J. Muend
by Jno. B. Coasdale
his Attorney Patented Mar. 1, 1927.

1,619,748

UNITED STATES PATENT OFFICE.

CHARLES J. MUEND, OF PHILADELPHIA, PENNSYLVANIA, ASSIGNOR TO HAINES, JONES & CADBURY COMPANY, A CORPORATION OF PENNSYLVANIA.

VALVE CONSTRUCTION.

Application filed February 12, 1926. Serial No. 87,753.

My invention relates to improvements in valve construction. The object is to provide improved means for assembling the valve mechanism for bath valves or the like, with the supporting wall or other structure, and for securing in proper relation thereto the covering bonnet, which is preferably of vitreous material.

The invention comprises improved adjustable means for clamping the valve construction to supporting walls varying in thickness, and also improvement in means for clamping the bonnet in position, independently of the main valve housing or of the packing nut usually associated therewith.

Referring to the drawings, which illustrates merely by way of example a suitable embodiment of my invention;

Fig. 1 is a longitudinal section.

Fig. 2 is a cross-section on line 2, 2 of Fig. 1.

Similar numerals refer to similar parts throughout the several views.

The valve housing proper comprises the valve body or nozzle formation 3, to which is secured the exteriorly threaded cylindrical extension 4. Within extension 4 is secured the tubular member 5 having an interiorly disposed quick or coarse thread for cooperating with threaded part of the valve spindle 6. This tubular formation is provided with the packing nut 7 threaded into its outer end. A clamping washer 8 is threaded on to the cylindrical extension 4. On the outer end of extension 4 is the threaded sleeve or thimble 9 having a threaded opening at its outer end for receiving the flanged nut 10 for securing the bonnet 11 as shown. Upon the sleeve or thimble 9 is threaded the clamping washer 12.

*In operation.*—It will be obvious that when the clamping nuts are both operated directly upon the extension, such as 4, the amount of adjustment possible, with respect to the thickness of the wall in which it is secured, is limited by the length of said extension, and that the length of the extension is necessarily limited. By providing the sleeve or thimble 9, which is adjustably secured on said extension 4, there is obviously secured an increased range of adjustment, without increasing the minimum total length possible. In other words the telescoping sleeve 9 upon which is mounted the cooperating clamping washer 12, gives an increased range of adjustment between the clamping washers or nuts 8 and 12.

As already indicated, the flanged nut 10 which is threaded into the end of sleeve 9 provides means for securing the bonnet 11 in position, independently of the position of the ends of either the cylindrical extension 4 or of the tubular body 5. Nor is the retaining nut 10 connected with the packing nut 7, as has been the usual practice.

What I claim is:—

1. In a valve construction, a valve housing having a threaded cylindrical extension, a valve spindle operating therein, an interiorly and exteriorly threaded sleeve telescoping on said threaded cylindrical extension, a clamping nut threaded on said threaded cylindrical extension and a cooperating clamping nut threaded on the telescoping sleeve.

2. In a valve construction, a valve housing having a threaded cylindrical extension, a valve spindle operating therein, an interiorly and exteriorly threaded sleeve telescoping on said threaded cylindrical extension, a clamping nut threaded on said threaded cylindrical extension, a cooperating clamping nut threaded on the telescoping sleeve, a hood surrounding the telescoping sleeve and the clamping nut thereon, and a clamping flanged nut surrounding the spindle, projecting through the hood with the flange engaging the top thereof, and threaded into the top of the telescoping sleeve.

3. In a valve construction, a valve housing having a threaded cylindrical extension, a tubular member secured within the cylinder, a cooperating valve spindle, an exteriorly threaded sleeve threaded on to the cylinder, a clamping element threaded on the sleeve, a hood surrounding the valve spindle and means threaded into said sleeve for securing the hood in position.

CHAS. J. MUEND.